United States Patent [19]

Bartley

[11] Patent Number: 5,024,407
[45] Date of Patent: Jun. 18, 1991

[54] ADJUSTABLE SUPPORT FOR LOUDSPEAKER

[75] Inventor: John E. Bartley, Greenfield, Wis.

[73] Assignee: Waukesha Specialties & Fabricators, New Berlin, Wis.

[21] Appl. No.: 560,412

[22] Filed: Jul. 30, 1990

[51] Int. Cl.$^5$ .............................................. A47B 97/00
[52] U.S. Cl. .................................................... 248/164
[58] Field of Search ............... 248/133, 397, 164, 431, 248/165, 166, 173; 108/115, 118; 297/56, 24, 25

[56] References Cited

U.S. PATENT DOCUMENTS

| 1,426,160 | 8/1922 | Driver | 108/118 |
| 1,952,610 | 3/1934 | Shearer | 297/25 |
| 2,794,492 | 6/1957 | Hamilton | 297/56 |
| 4,763,865 | 8/1988 | Danner | 248/166 |

FOREIGN PATENT DOCUMENTS

| 806707 | 4/1951 | Fed. Rep. of Germany | 297/25 |
| 796458 | 4/1936 | France | 297/25 |
| 330977 | 6/1930 | United Kingdom | 297/25 |

Primary Examiner—Ramon O. Ramirez
Assistant Examiner—Robert A. Olson
Attorney, Agent, or Firm—Arnold J. Ericsen; C. Thomas Sylke

[57] ABSTRACT

A support for holding a loudspeaker in an elevated and tilted position is provided. The support includes a pivotable X-shaped frame formed of two legs pivotally connected together at a point equidistant from their respective bottom ends with the upper portions of said legs being of unequal length. The short leg has its upper portion facing forwardly and its lower portion rearwardly. Each leg has an arm and a foot perpendicularly secured to its top and its bottom, respectively. The upper end of the longer leg is bent forwardly at a point located approximately ¼ to ⅓ of the distance from the pivot point to the top of the leg at an angle between about 20° and 45°. The forwardmost arm is lower than the rearward arm and is adapted to support the bottom of a loudspeaker while the upper arm is adapted to support rear of the speaker in a backwardly tilted orientation.

3 Claims, 1 Drawing Sheet

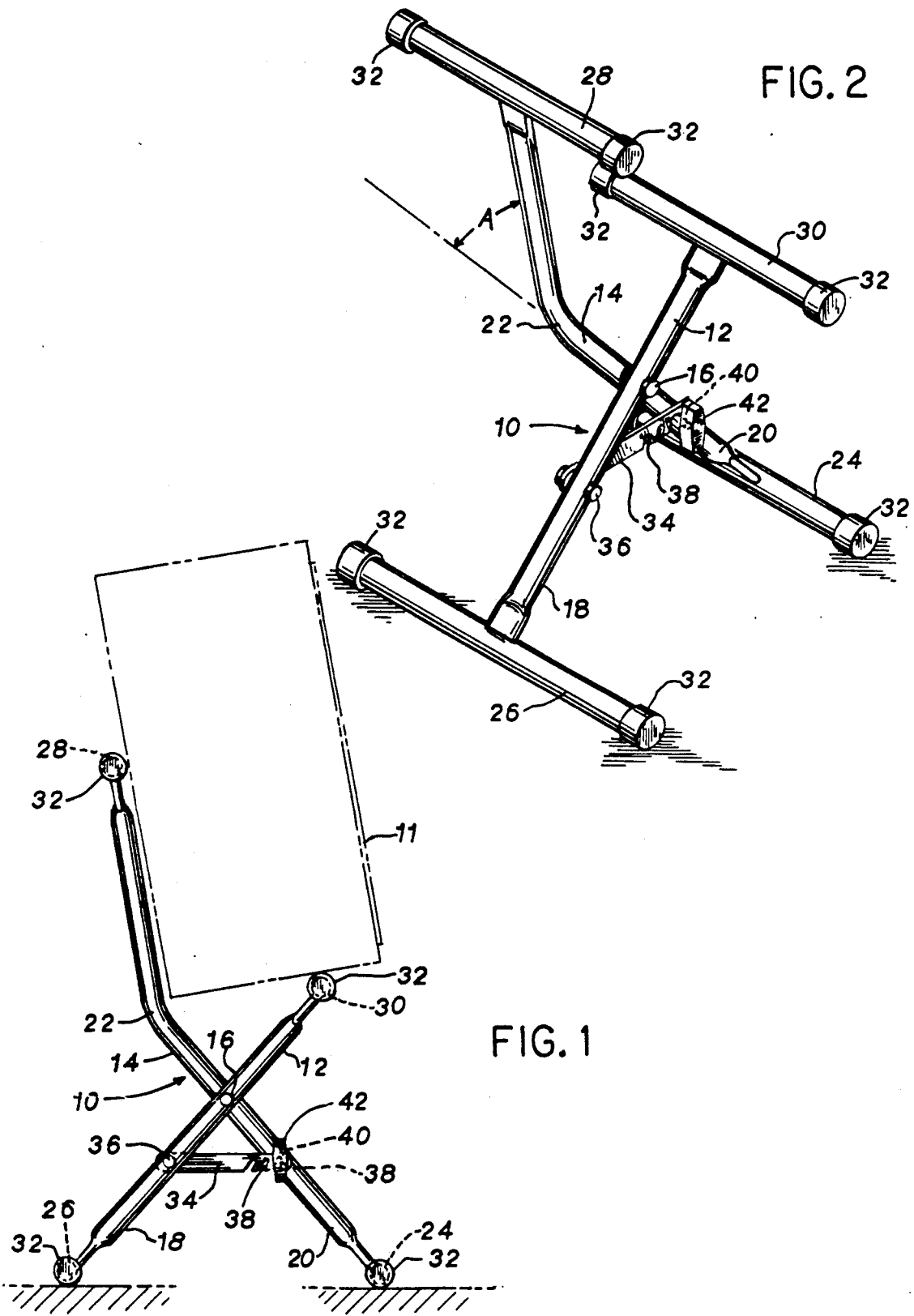

5,024,407

ADJUSTABLE SUPPORT FOR LOUDSPEAKER

BACKGROUND OF THE INVENTION

1. Field of the Invention

This invention relates to an adjustable support for a loudspeaker formed from a generally X-shaped frame and adapted to support the speaker in an elevated position with a desireable backward tilt.

2. Description of the Prior Art

Various shelves and supports have been suggested for use in elevating loudspeakers such as hi-fidelity loudspeakers off of the floor or other base surface.

Such devices, however, often are not adjustable for different sizes and styles of speakers and, moreover, do not provide a desirable backward tilt of approximately 3° to 10° which is desirable to optimize the acoustics particularly in the case of a hi-fidelity stereophonic music system. Similarly, other types of loudspeakers benefit in terms of their acoustical performance by having such a backward tilt. Typically, many supports or shelves have required the user to improvise some type of shim under the speaker in order to provide the desired tilt. A need is therefore existed for a simple, economical, adjustable support device.

It is an object of the present invention to overcome the foregoing shortcomings of the prior art by providing an adjustable support that is simple, inexpensive, adjustable, light weight, portable and convenient to use. Further objects of the invention will become apparent from the accompanying detailed description and accompanying drawings.

Briefly summarized, the present invention provides a support for holding a loudspeaker such as a hi-fidelity musical speaker for a stereophonic system in an elevated and tilted position which is adjustable. The support includes a pivotable X-shaped frame formed of two legs pivotally connected together at a point equal in distance from their respective bottom ends with the upper portions of said legs being of unequal lengths. The shorter leg has its upper portion facing forwardly and its lower portion rearwardly. Each leg has an arm and a foot perpendicularly secured to its top and bottom end, respectively. The upper end of the longer leg is bent forwardly at a point located approximately ¼ to ⅓ of the distance from the pivot to the top of the leg at an angle between about 20° and 45°. The forwardmost arm is lower than the rearward arm and is adapted to support the bottom of a loudspeaker while the upper arm is adapted to support the rear of the speaker in a backwardly tilted orientation. A tie member is pivotally attached to one of the legs at a point spaced below the pivot pin and is adjustably attachable to the other leg at a similarly spaced point below the pivot pin. The configuration of the support (i.e., the height and angle of tilt) is adjusted by attaching the tie member at various points of adjustment.

DRAWINGS

The invention will be further explained with reference to the accompanying drawings wherein:

FIG. 1 is a side view of a support of the present invention with a speaker held in place thereon, and, FIG. 2 is a perspective view of the support shown in FIG. 1.

DETAILED DESCRIPTION

Referring particularly to the drawings there is seen a support 10, for a loudspeaker 11, which comprises a pair of legs 12 and 14 pivotally attached together at their crossing point by pin 16. The lower ends 18 and 20 of legs 12 and 14, respectively, are preferably of equal length while the upper ends, as shown in the drawings, are of unequal length.

As also seen, the shorter leg has its lower portion 18 oriented to the rear of the device while the longer leg has its lower portion 20 oriented forwardly. The longer leg 14, which has its upper portion oriented to the rear of the device is bent at point 22 which is located approximately ¼ to ⅓ of the distance from pivot point 16 to the top of leg 14. Legs 12 and 14 are provided with feet 24 and 26 which are rigidly secured at an orientation perpendicular to the axis of the legs. The shorter leg 12 is preferably provided with a longer foot 26 which is located at the rear of the device preferably adjacent to a wall or the like.

Also rigidly affixed in a perpendicular orientation to the tops of legs 12 and 14 are arms 28 and 30. Feet 24 and 26 and arms 28 and 30 are preferably welded to their respective ends of legs 12 and 14. The upper and lower ends of legs 12 and 14 are preferably flattened to accomodate welding of the materials together. Preferably legs 12 and 14, feet 24 and 26 and arms 28 and 30 are all formed of hollow tubular metal generally steel. The components are finished either with chrome plating or, often with a flat black matte finish, as desired. The ends of the hollow tubular arms and legs 24, 26, 28 and 30 are all preferably capped with elastomeric skid resistant caps 32 which tend to protect the finish of the speaker 11 and additionally provide a cushioned frictional contact with the surfaces of the speaker.

As also seen in the drawings, the upper end of arm 14 is bent at an angle A which is preferably between about 20° and 45°, at a point located approximately ¼ to ⅓ of the distance between the pivot point 16 and the top of arm 14.

The legs 12 and 14 are adjustably securable in varying orientations with respect to each other by means of a tie member 34 which is pivotally connected to one of the legs by a pin 36 through one end of tie member 34 and is adjustably attached by means of slots or notches 38 at the opposite end thereof which engage a pin 40 passing through the other leg. Slots 38 are fitted over pin 40 and the tie member 34 is secured to the leg by tightening a wing nut 42 which rigidly affixes the entire support in a selected orientation.

In use, the tilt of the support is chosen to best accomodate the dimensions of a particular loudspeaker 11 and is also dependent on the amount of backward tilt desired. It has generally been found preferable to tilt a loudspeaker backwardly approximately 3° to 5° from the vertical position although greater or lesser amounts of tilt can be provided. As seen in FIG. 1, the shorter leg 12 supports the base of loudspeaker 11 while the longer bent arm 14 supports the rear of the inclined speaker 11.

Further adaptations or minor modifications within the spirit of the invention will be apparent to those skilled in the art.

What is claimed is:

1. A support for holding a loudspeaker in an elevated and tilted position comprising a pivotable X-shaped frame formed of two legs pivotally connected together by a pivot pin at a point equal in distance from the respective bottom ends of said legs; the upper portions of said legs being of unequal length, with the shorter of said legs having its upper portion facing forwardly and its lower portion rearwardly; each of said legs having a foot rigidly, perpendicularly secured thereto its bottom end, the rearward foot, attached to said shorter leg, being of greater length than the forward foot; the upper end of said longer leg being bent forwardly at a point located approximately ¼ to ⅓ of the distance from the pivot point to the top of said leg at an angle between about 20° and 45°; a tie member pivotally attached to one of said legs at a point spaced below the pivot pin and adjustably attachable to the other leg at a similarly spaced point below the pivot pin; the upper end of each of said legs having an arm rigidly perpendicularly affixed to the upper end of said leg, the forwardmost arm being lower than the rearwardmost arm and being adapted to support the bottom of a loudspeaker, and said upper arm being adapted to support the rear of said speaker in a backwardly tilted orientation.

2. A support according to claim 1 wherein said legs, arms and feet are forward from hollow metallic tubes.

3. A support according to claim 2 wherein the ends of each of said arms are provided with elastomeric caps to provide cushioned, frictional contact with said speaker.

* * * * *